Feb. 2, 1960 W. R. SMITH-VANIZ, JR 2,923,814

STATIC ELIMINATION SYSTEM

Filed July 18, 1956 4 Sheets-Sheet 1

INVENTOR
WILLIAM R. SMITH-VANIZ
BY
Curtis, Morris & Safford
ATTORNEYS

Feb. 2, 1960 W. R. SMITH-VANIZ, JR 2,923,814

STATIC ELIMINATION SYSTEM

Filed July 18, 1956 4 Sheets-Sheet 2

INVENTOR.
WILLIAM R. SMITH-VANIZ
BY
Curtis, Morris & Safford
ATTORNEYS

Feb. 2, 1960 W. R. SMITH-VANIZ, JR 2,923,814

STATIC ELIMINATION SYSTEM

Filed July 18, 1956 4 Sheets-Sheet 3

INVENTOR.
WILLIAM R. SMITH-VANIZ
BY
Curtis, Morris & Safford
ATTORNEYS

Feb. 2, 1960 W. R. SMITH-VANIZ, JR 2,923,814

STATIC ELIMINATION SYSTEM

Filed July 18, 1956 4 Sheets-Sheet 4

INVENTOR.
WILLIAM R. SMITH VANIZ
BY
Curtis, Morris & Safford
ATTORNEYS

United States Patent Office 2,923,814
Patented Feb. 2, 1960

2,923,814

STATIC ELIMINATION SYSTEM

William R. Smith-Vaniz, Jr., Norwalk, Conn., assignor to C.G.S. Laboratories, Inc., Stamford, Conn., a corporation of Connecticut Application July 18, 1956, Serial No. 598,643

15 Claims. (Cl. 250—20)

This invention relates to improvements in static elimination systems, and has as its general object the provision of a system for eliminating static signals from the mixture of static and desired audio frequency signals customarily occurring in the output of radio receiving apparatus. While not necessarily limited thereto, the present invention has particular application to so-called continuous wave or "C.-W." signal reception of such signals, thata is, as a keyed C.-W. demodulator.

The conventional C.-W. radio receiver converts keyed radio frequency signals ("dots" and "dashes") to an audio frequency representation of the original keying. These audible signals are often delivered by the receiver mixed with interfering signals of various kinds (referred to collectively herein as static), depending on reception conditions at the time. In accordance with one feature of the present invention, this mixture of wanted and unwanted signals from the receiver is passed through a highly selective (narrow bandwidth) filter which will eliminate substantially all of the unwanted signals having frequencies outside the very narrow pass band of the filter. In order that the filter bandwidth can be kept extremely narrow, an automatic tuning control is provided for the radio receiver, to maintain the desired signal at a frequency accurately centered with respect to the filter pass band. Otherwise, the pass band of the filter would have to be wide enough to cover the full range of possible variation in frequency of the wanted signal. This, of course, would allow a correspondingly wider frequency band of noise signals to come through the filter.

It can also be shown that most individual static signals are of relatively short duration; much shorter than the shortest "dot" signal in C.-W. transmissions. Furthermore, such static signals usually have frequency components extending over a relatively wide frequency band. In accordance with a further feature of the present invention, the broad band characteristics of static signals are utilized to advantage by having such signals effectively suppress themselves by a signal amplitude comparison technique. In another portion of the system, the short duration characteristics of static are relied on to prevent such signals from passing through a circuit which will pass only signals of predetermined duration.

Figure 1:
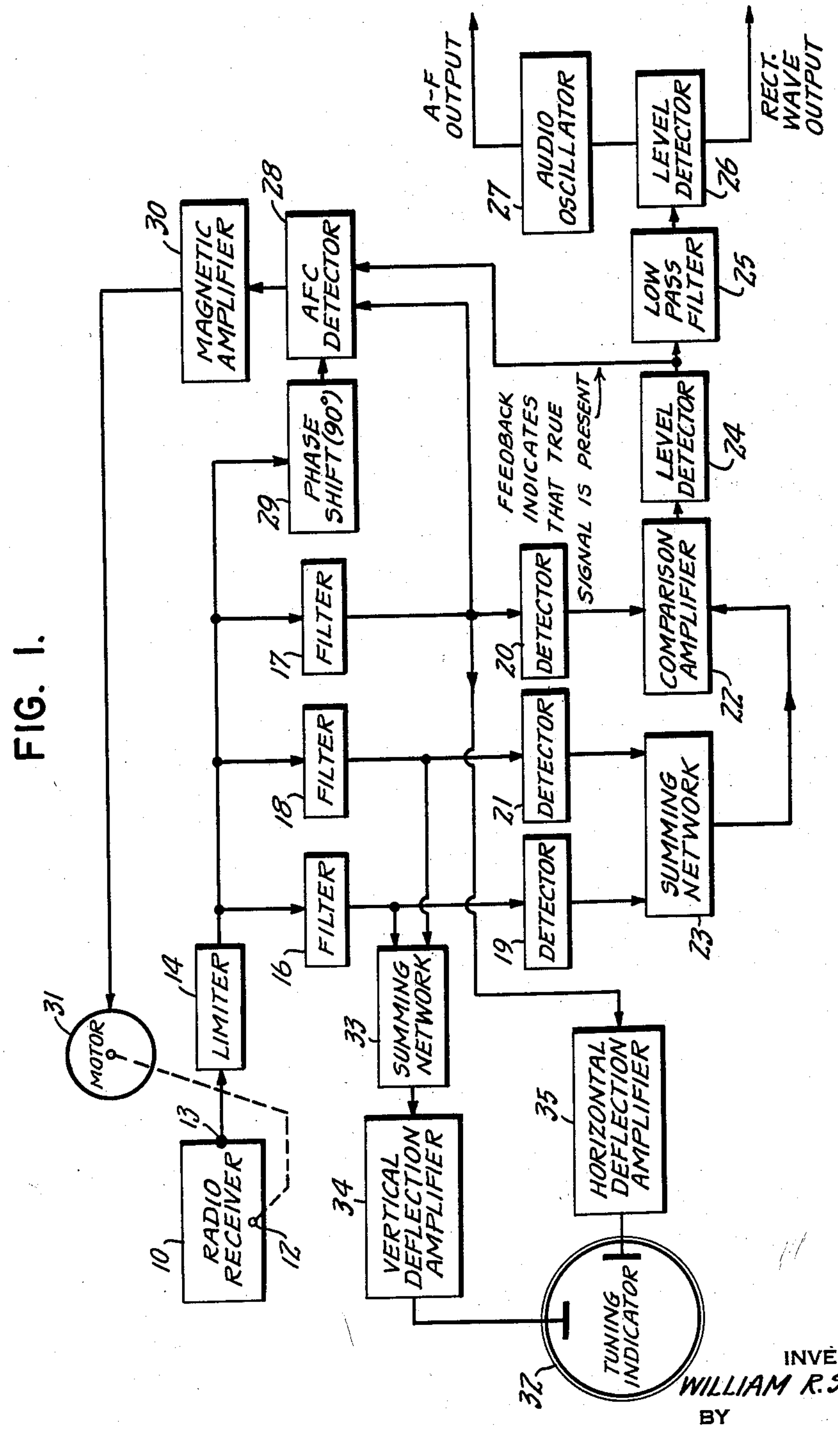
Figure 2:
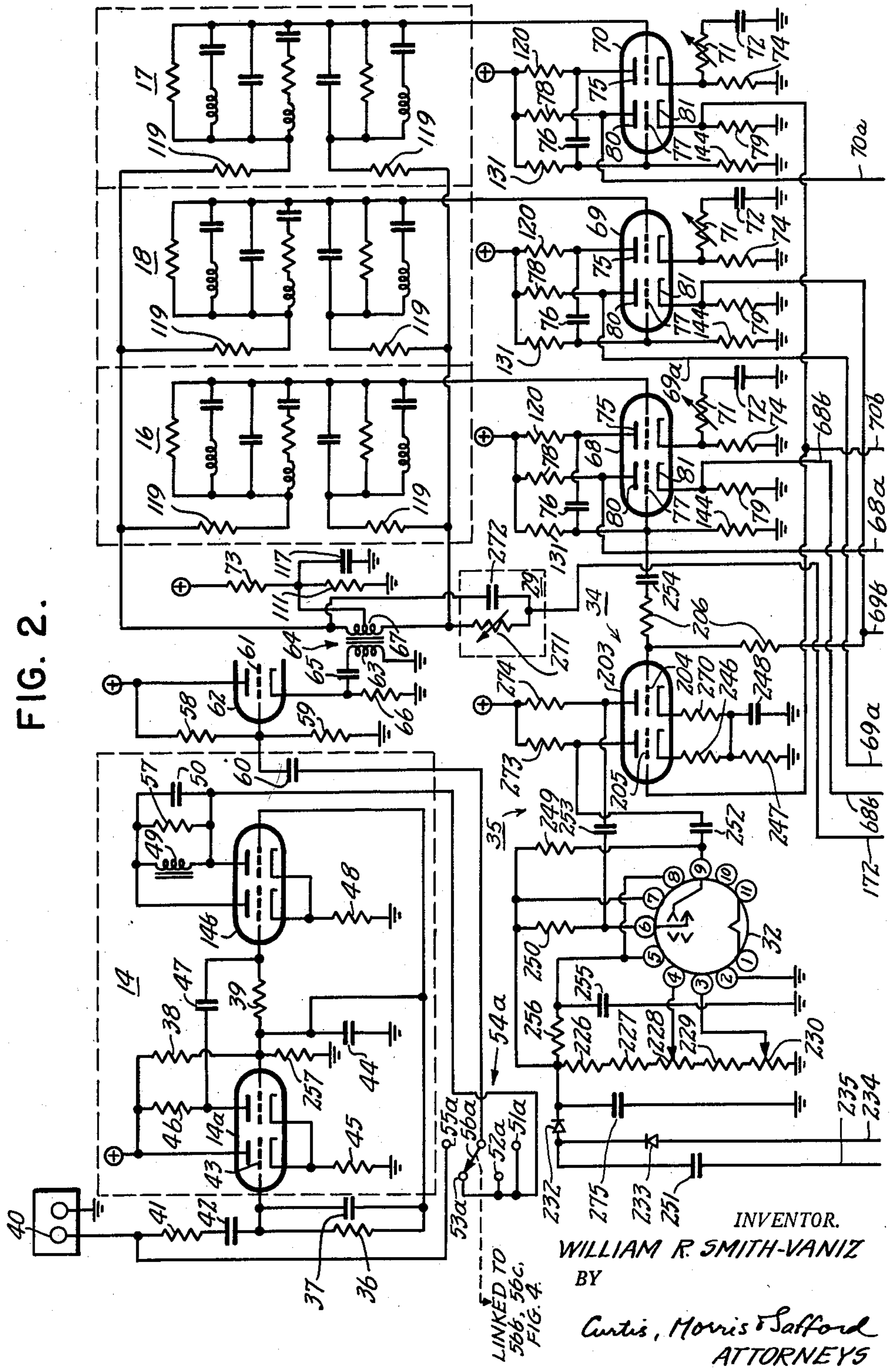
Figure 3:
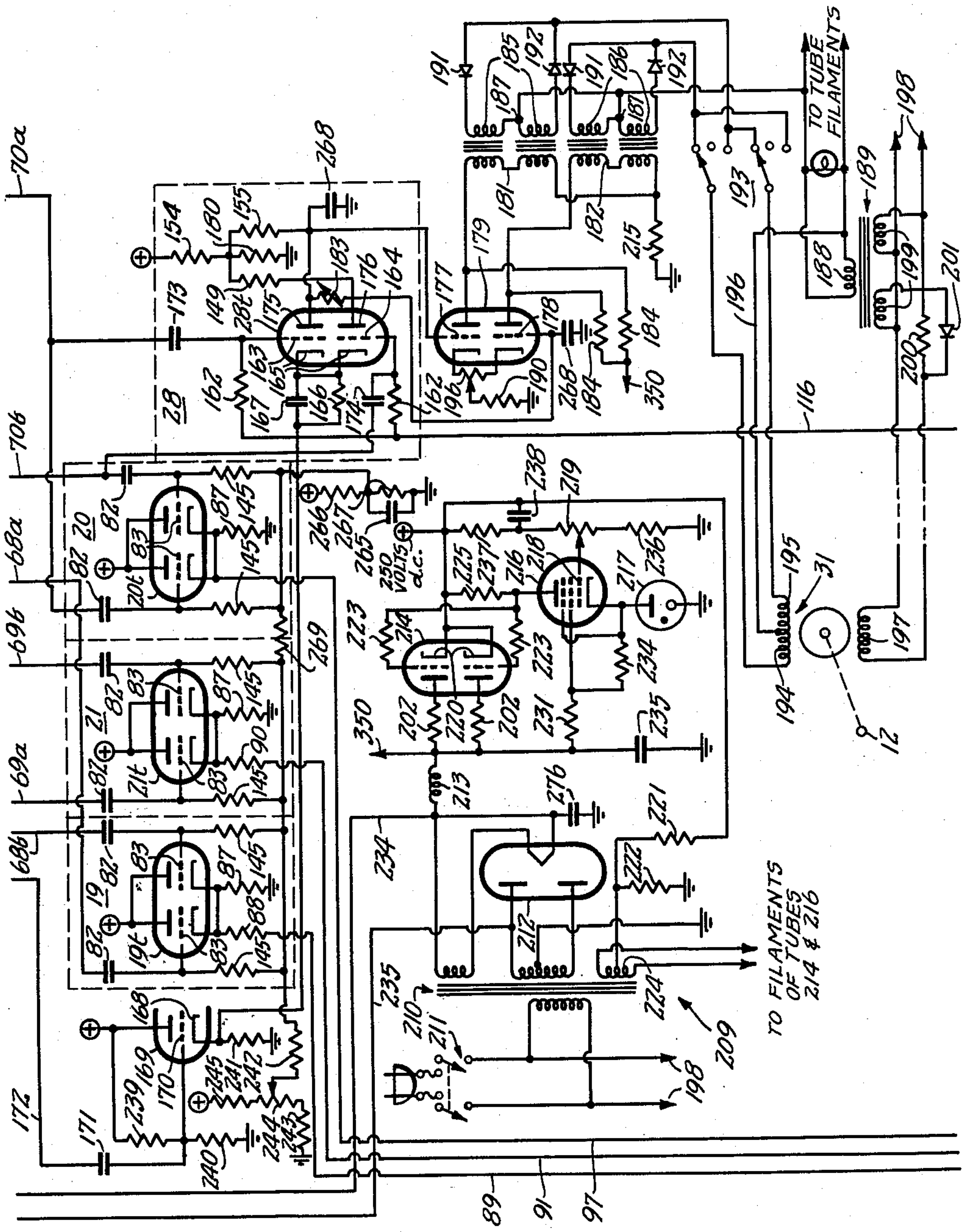
Figure 4:
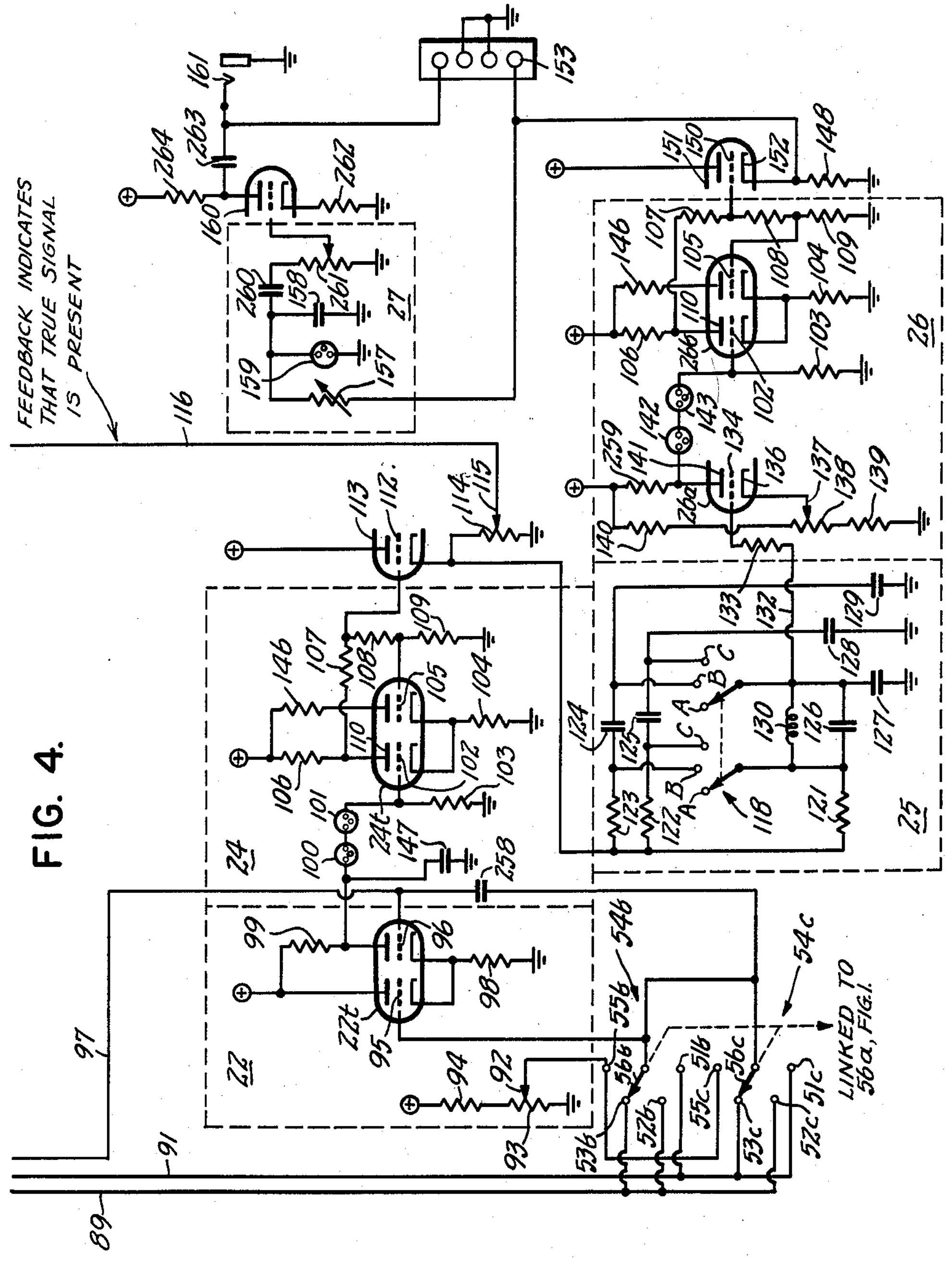

A more complete understanding of the invention, and of further objects and features thereof, can be had by reference to the following description of an illustrative embodiment thereof, when considered in connection with the accompanying drawing, wherein Figure 1 is a block diagram showing the principal components of a static eliminator embodying the present invention, and Figures 2–4 are detailed schematic diagrams of circuits in a static eliminator embodying the present invention.

Referring to Figure 1 of the drawing, a static eliminator embodying the present invention is shown connected to receive signals from a conventional superheterodyne radio receiver 10. The receiver 10 has a control shaft 12 for tuning the receiver to incoming signals of a desired frequency. In the usual case, the tuning control 12 will adjust tne radio frequency (R.-F.) amplifier stages of the receiver 10, and also will regulate the tuning of the local oscillator in the receiver so as to obtain a preselected intermediate frequency (I.-F.) beat between the incoming R.-F. signals and the local oscillator output. In the case of C.-W. code signals, the amplified I.-F. signals will be converted to an arbitrarily chosen audio frequency (A.-F.) by mixing the I.-F. signals with the output from a so-called beat frequency oscillator in the receiver, and the resultant A.-F. signals will be delivered at the receiver output 13, often mixed with interfering static signals of random character. It will be evident that the frequency of the A.-F. signals at the receiver output 13 can be varied within reasonable limits by adjusting the tuning control 12, because this will vary the frequency of the I.-F. signals, which then will change the beat note obtained by mixing the I.-F. signals and the output of the beat frequency oscillator.

In accordance with the present invention, the receiver output 13 is connected to a limiter stage 14, wherein the mixed signals from the receiver all are held to a predetermined maximum amplitude. Here the first static elimination takes place, because the limiter 14 reduces all high amplitude static signals to a common level.

In the present illustrative case, it will be assumed that the receiver 10 is tuned to provide A.-F. signals at a nominal frequency of 2500 cycles per second (c.p.s.). These 2500 c.p.s. signals, with accompanying static, pass from the limiter 14 into three parallel filter networks 16, 17, 18.

The three filters 16, 17, 18 have adjacent, very narrow pass bands, centering at the desired incoming frequency of 2500 c.p.s. For example, the low frequency filter 16 may be tuned to the band 2050–2350 c.p.s.; the intermediate or center frequency filter 17 may be tuned to the band 2350–2650 c.p.s.; and the high frequency filter 18 may be tuned to the band 2650–2950 c.p.s. It will, of course, be understood that each filter will have maximum response at the center of its stated band, and that the limiting frequencies given merely represent points at which the filter response will be down a preselected number of decibels below the center frequency response. In these networks 16–18, substantially all static above 2950 c.p.s. and below 2050 c.p.s. will be eliminated. Actually, as far as the final output of the eliminator is concerned, all static below 2350 c.p.s. and above 2650 c.p.s. is eliminated at this point, because only those signals passing through the center filter 17 will reach the output end of the system, as will be brought out presently.

Those signals passing through the filters 16–18 next go to individual detectors 19, 20, 21; one for each of the filters 16, 17, 18, respectively. In the detectors 19–21, all signals are demodulated, and the demodulated signals next go to a comparison amplifier 22. The signal from the center band detector 20 goes to one input of the comparison amplifier 22, while the two side band signals are combined in a summing network 23 and then go to a second input of the comparator 22.

The comparison amplifier 22 is designed to respond only to differences between signals applied to its two inputs. Accordingly, if the two inputs to the comparator are the same, nothing will appear at the comparator output. On the other hand, if a signal arrives at one of the comparator inputs in the absence of any signal or with a different signal at the other input, the comparator will deliver an output representing the difference between the signals it has received.

As was previously noted, most static signals having components within the response range of the two side band filters 16, 18 will have similar components within the response range of the center band filter 17. Accordingly such signals will cancel each other out at the comparator and be eliminated at that point. However, C.-W. code signals at the center frequency of 2500 c.p.s. will have no components of appreciable magnitude in the side bands, and such signals will, therefore, pass freely through the comparison amplifier 22. As a result, static and code signals coming to the comparator 22 simultaneously will appear in the comparator output as code signals only, since the static will cancel itself at the comparator except for instances in which random static occurs with components only in the center filter pass band or only in the side bands.

From the comparator 22, the code signals with any residual static go to a level detector stage 24. In the level detector, only those signals will pass through which are of greater than a predetermined amplitude, and all signals which do pass through appear with uniform amplitude at the level detector output. The level detector 24 is followed by a low pass filter 25, which operates in conjunction with a second level detector 26 as a "signal duration detector." In other words, only signals of greater than predetermined duration will pass through the filter 25 with sufficient amplitude to get through the second level detector. This, of course, eliminates any unwanted signals of duration shorter than the predetermined length, which is preferably selectable with respect to the "words per minute" (w.p.m.) rate of the desired signal transmission. From the final level detector 26, a rectangular wave representing the original code transmission is made available for operating automatic code translator equipment or the like. Alternatively, the same rectangular wave can be used to key an audio oscillator 27 to permit audible reproduction of the original code keying.

It can be appreciated that the system as thus far described is quit dependent for its proper functioning on receiving the desired signals only at or very near the midfrequency of the center band filter 17. Any appreciable frequency deviation will result in the desired signal coming through one or the other side band filter, to an extent depending on the amount of deviation, with obvious adverse results. To insure against this happening, an automatic frequency control (AFC) feedback loop is provided between the static elminator and the receiver 10.

The feed-back loop includes an AFC detector 28 which is connected at one input to the center band filter 17. Since signals of varying frequency will also vary in phase in passing through the filter 17, the output of filter 17 is compared in the detector 28 with a fixed phase signal obtained from the filter input through a fixed 90° phase shifting circuit 29. The detector 28 will respond only when the two signals received at its two inputs have a phase relationship to each other of more or less than 90°. Also, in order to be sure that the detector 28 will respond only to desired signals and not to static signals, the detector 28 normally is held inoperative, being turned on only when a true signal is present by a keying signal obtained from the first level detector stage 24.

The AFC detector output is made available in the form of D.C. currents representing signals which are above or below the midfrequency of the center band filter 17. These currents are applied to a magnetic amplifier 30 which controls the excitation of a reversible motor 31 mechanically linked to the tuning control 12 of the receiver. Accordingly, if the signal reaching the filter 17 from the receiver 10 deviates above or below the center frequency of the filter 17, the motor 31 will adjust the receiver 10 to correct for the deviation.

To facilitate adjustment of the system, it is helpful to have a visual indication of receiver tuning. Accordingly, the system may include a cathode ray tube 32 which receives vertical deflection voltage from the side band filters 16, 18 through a "summing" network 33 and an amplifier 34, and horizontal deflection voltage from the center band filter 17 and an amplifier 35. The resultant Lissajous figure on the cathode ray tube screen, in the form of an ellipse, provides a convenient indication of receiver tuning. If the tuning is such as to provide an audio signal above or below the correct frequency, the figure on the screen will indicate that fact by being tilted in one direction or another, as described in more detail hereinafter.

The complete circuit diagram is given in Figures 2–4 for a typical system as shown in block form in Figure 1. In Figures 2–4, the various blocks of Figure 1 are outlined by broken line rectangles to the extent that the circuit layout permits. Also, where possible, the tubes shown in Figures 2–4 have the same numerals (with distinguishing subscripts) as the blocks in which they occur, to further facilitate comparison between Figure 1 and Figures 2–4.

Referring first to Figure 2, an A.-F. input jack 40 is provided, through which to apply signals from the receiver to the static eliminator system. The jack 40 is connected through a resistor 41 and a capacitor 42 to one grid 43 of a dual triode tube 14*a*, which is connected as a cathode coupled amplifier with a common cathode resistor 45. Here the incoming signals are amplified to some extent, and those of greater than predetermined amplitude are limited in passing through the amplifier 14*a*. The signal voltage developed across the plate load resistor 46 for the second section of the tube 14*a* is passed through a coupling capacitor 47 to a second dual triode 14*b* which has a circuit similar to that of the first tube 14*a* except for the provision of an L-C filter 49, 50 in its output circuit. The filter 49, 50 is tuned to the midfrequency of the center band filter (in this case, 2500 c.p.s.), and provides some preliminary filtering action to emphasize the desired portion of incoming signals. From the filter 49, 50, a connection is made to three fixed contacts 51*a*, 52*a*, 53*a* of a selector switch 54*a*. The switch 54*a* has an additional fixed contact 55*a* which is connected to the input jack 40, and a movable contact 56*a*. In practice, the switch 54*a* preferably constitutes one part of a multi-section ganged switch 54*a*, 54*b*, 54*c*, the other parts of which are described hereinafter. This switch 54*a–c* permits the operator to select any one of four operating conditions: one in which the limiter and the three noise filter channel circuits are not used at all but the remainder of the circuit is used; one in which both the high and low frequency filters 16, 18 are used for noise suppression; one in which only the high frequency filter 18 is used; and one in which only the low frequency filter 16 is used. The first selection would be made, for example, where the signal does not disappear as it normally should during spaces (as where there is "back wave" and "soft keying") or when coherent signals appear in both the high and low frequency filter bands (as in the case of modulated continuous-wave transmission). The second setting is the one used for receiving normal signals and uses both the high and low frequency filters 16 and 18. This second selection would be used where there are static components present of relatively uniform frequency distribution. The other two choices are available for special types of interference which have components either predominantly above or below the desired signal frequency, as where an unwanted transmission is coming in at a frequency very close to the desired signal. With respect to switch section 54*a*, the "no suppression" position is with movable contact 56*a* engaging fixed contact 55*a*. In this case, it is seen that the first two amplifiers 14*a*, 14*b* are completely bypassed through switch section 54*a*. In the other three positions of the selector 56*a*, the incoming signal will pass through the tubes 14*a*, 14*b* as described, and be conducted through the switch 54*a* and through a coupling capacitor 60 to the grid 61 of a triode tube 62 connected as a cathode follower. The primary winding 63 of a coupling transformer 64 is connected in series with a blocking condenser 65 across the cathode load resistor 66 of the tube 62.

The coupling transformer secondary 67 is connected to transfer the cathode follower output signal in parallel to all three of the filter networks 16–18. These filters 16–18 have the characteristics which have already been described in connection with Figure 1, and as they may take many different forms their detailed configuration will not be described. The output side of each filter is connected to one of three separate but identical amplifier and phase splitter tubes 68, 69, 70.

The amplifiers and phase splitters 68–70 each comprise a dual triode tube, the input section of which preferably is provide with gain adjusting means such as a variable resistor 71 connected in series with a capacitor 72 across a cathode resistor 74. This allows initial adjustments to be made so that each of the amplifiers 68–70 will provide identical amplification to signals occurring at its associated filter center frequency.

The plates 75 of the amplifier sections of the tubes 68–70 are connected to transfer amplified signals through capacitors 76 to the grids 77 of the phase splitter sections of the tubes. The phase splitter sections will provide signals of equal amplitude but opposite phase across their identical anode and cathode load resistors, 78 and 79, respectively. The anodes 80 and cathodes 81 of the phase splitters are connected via leads 68*a*–70*b* and coupling capacitors 82 (see Figure 3) to the grids 83 of three separate but identical full wave detectors comprising dual triode tubes 19*t*, 20*t*, 21*t*.

Each of the detector tubes 19*t*–21*t* has common plate and cathode connections, and common cathode load resistor 87. Each receives at its grids 83 from its associated phase splitter a pair of identical but 180° out of phase signals. Due to the common cathode connection of each of the two tube sections, a positive half cycle of signal voltage at the grid of either section will cause that section to conduct heavily and thereby bias off the other section. On the succeeding half cycle of the signal, when the opposite grid is driven positive, the first section of the tube will be similarly biased off. Thus, the output appearing across the common cathode resistor 87 of each tube 19*t*–21*t* will be a full-wave-rectified signal. From this point on in the system, the signals which have passed through the three filters 16–18 and their associated tubes 68–70 and 19*t*–21*t* take somewhat different paths.

The lower side band detector 19*t* is connected through a resistor 88 and conductor 89 (see Figure 4) to two fixed contact 52*b*, 53*b* of a selector switch section 54*b*, and to one fixed contact 52*c* of another selector switch section 54*c*. The upper side band detector 21*t* is connected through a similar resistor 90 and conductor 91 to one fixed contact 51*b* of the selector switch section 54*b*, and to two fixed contacts 51*c*, 53*c* of the other selector switch section 54*c*. The remaining fixed contacts 55*b* and 55*c* of the selectors 54*b* and 54*c*, respectively, are both connected to the tap 92 of a potentiometer 93 in a voltage divider network 93, 94. The movable selector switch contacts 56*b*, 56*c* have a common connection to one grid 95 of a dual triode tube 22*t*. This tube 22*t* comprises the comparision amplifier tube. Its other grid 96 is connected by a lead 97 directly to the center band detector 20*t*.

With the movable selector contacts 56*b*, 56*c* engaging the fixed contacts 53*b*, 53*c*, respectively, it can be seen that the two side band detectors 19*t*, 21*t* will be connected simultaneously to one comparison tube grid 95 through the resistors 88, 90, while the other grid 96 is connected to the center band detector 20*t*. The resistors 88, 90 serve as "summing" elements (corresponding to block 23, Figure 1) for the side band signals, so that a static signal which hase components extending across all three filter bands will arrive at the two sections of the comparison tube 22*t* as two substantially identical signals. The comparison tube 22*t* has common cathode connections to a resistor 98, and its two grids 95, 96 receive essentially identical D.C. bias by their connection to like points in the detector circuits 19–21. Accordingly, the comparison tube 22*t* will respond only to a difference in signals at its grids, and there will be no output from the circuit 22 under the signal conditions just described. In other words, any signal which extends across the whole spectrum of the static eliminator is assumed to be static and is caused to cancel itself out at the comparator 22. Of course, in the absence of any side band components, any signal coming through the center band filter 17 will pass freely through the comparison amplifier 22*t*.

Also, if the movable switch contacts 56*b*, 56*c* are set on the fixed contacts 55*b*, 55*c* (the "no-suppression" switch position), the tube grid 96 will merely receive a fixed D.C. bias from the potentiometer 93, and signals of any kind coming through the filter 17 will pass freely through the comparator. This switch position can be used when the only interference present in the receiver output is at frequencies outside the very narrow pass band of the center filter 17. The other two available switch positions let the operator select either side band alone for suppression action, as mentioned previously. For example, an interfering transmission which appears in the receiver output as an A.-F. signal at, say, 2400 c.p.s. will come through the lower side band filter 16 to some extent, and can be made self suppressing to that extent by placing the movable switch contacts 56*b*, 56*c* on the fixed contacts 52*b*, 52*c* respectively.

Signal voltages developed across the comparison amplifier load resistor 99 are coupled through a pair of series connected neon tubes 100, 101 to the grid 102 of one section of a dual triode tube 24*t*. The tube 24*t* functions as a signal level detector.

It will be noted that the neon tubes 100, 101, in combination with the plate resistor 99 and a grid return resistor 103, form a voltage divider from which a positive D.C. bias is applied to the tube grid 102. The tube 24*t* has common cathode connections to a resistor 104, and has its other grid 105 connected to a voltage divider network comprising the anode load resistor 106 of the first tube section in series with three additional resistors 107, 108, 109. These connections make the amplifier 24*t* bi-stable in operation. That is to say, for all possible signals at the input grid 102, there are only two possible voltages which can be obtained at the output plate 110. The switch-over between these two stable conditions occurs at one critical input grid voltage. As long as the comparison amplifier 22*t* remains inactive (due to no signals or substantially identical signals at its grids), there will be a relatively constant positive voltage applied to the input grid 102 of the bi-stable amplifier, causing that section of the tube 24*t* to conduct heavily. This will hold the plate 110 in its relatively least positive stable condition. However, a code "mark" (dot or dash) signal will cause the amplifier 22*t* to conduct current, developing a negative-going impulse at the bistable amplifier input. This impulse will switch conduction to the other section of the tube 24*t*, providing a positive-going impulse at the plate 110. Thus, the signals coming from the bistable amplifier 24*t* will be in the form of a rectangular wave, the relatively more positive portions of which will represent code marks. It is to be noted, further, that any signal of less than predetermined amplitude cannot "trigger" the amplifier 24*t*, and accordingly will be eliminated at this point in the system.

The load resistor for the cathode follower tube 113, to which the level detector 24*t* is connected, comprises a potentiometer 114 whose tap 115 is connected by a lead 116 to a frequency control network (Figure 3) described hereinafter. The full signal voltage developed across the load 114 is taken to an adjustable low-pass filter network 25.

The signal transfer characteristics of the filter 25 are controlled by a selector switch 118. The three positions of the switch 118 indicated by the fixed contacts A, B, C, permit the selection of three different combinations of resistive, capacitive and inductive filter elements 121—130, to allow setting up a proper relationship between the filter characteristics and the "words per minute" (w.p.m.) rate of the desired signals being received The reason for this is the filter 25 operates in conjunction with another level detector 26, as described shortly, to pass only signal pulses of duration greater than the duration of a "dot" in code transmission, at whatever w.p.m. rate is selected at the switch 118. Since the w.p.m. rate may vary from less than 5 up to 500, it is desirable to be able to match the filtering action to the variable lengths of the signal marks.

The output line 132 from the filter 25 connects through a decoupling resistor 133 to the grid 134 of a triode tube **26*a*. The tube cathode 136 is connected to the tap 137 of a potentiometer 138 in a voltage divider network 138—140, from which a positive cut-off bias is applied to the cathode 136. The plate 141 of the tube 26*a* is connected through neon tubes 142, 143 to the grid 102 of the first section of a bistable amplifier 26*b*. The remainder of the circuit of the tube 26*b* is identical to that for the tube 24*t***, as indicated by the correspondingly numbered parts.

If the selector switch 118 is set at, say 100 w.p.m. (switch position "A"), and a dot signal comes to the filter 25 in a transmission which is below the 100 w.p.m. rate, such a signal will be long enough in duration to trigger the bistable amplifier **26*b*, producing a positive going pulse at the plate 110 of the first section. The characteristics of the circuit of tube 26*b* are such that this positive pulse will be exactly equal in duration to the pulse that triggered the circuit. Any signal coming to the filter 25 and having a duration shorter than that of a dot at the 100 w.p.m. rate will not come through the filter in a form which will trigger the amplifier 26*b*. Obviously, this will eliminate all static signals of duration shorter than the duration of one dot at the selected w.p.m. setting of the switch 118. The potentiometer 138 in the cathode circuit of the coupling amplifier 26*a* allows proper selection of the pulse amplitude which will trigger the bistable amplifier 26*b***

Positive pulses developed at the plate 110 of the amplifier **26*b* are applied to the grid 150 of a triode cathode follower tube 151, and taken from the tube cathode 152 to an output jack 153 which can be connected to an automatic code translator, for example, or any device operable on rectangular-wave signals. Preferably, the system also includes an A.-F. tone generator 27, such as a relaxation oscillator comprising a series-connected resistor 157 and capacitor 158, with a gas tube 159 shunting the capacitor. During the application of a positive pulse to the oscillator, the capacitor will recurrently charge through the resistor and discharge through the gas tube, at a frequency dependent on the capacitor charge time as controlled by the variable resistor 157. The A.-F. signals thus generated in the oscillator 27 are passed through a triode amplifier tube 160 and made available at an output jack 161**.

Returning to that portion of the system just preceding the low pass filter 25, the lead 116 from the cathode follower tube 113 (Figure 4) is connected (see Figure 3) to two resistors 162 which lead to the grids 163, 164 of a dual triode tube **28*t* functioning as the AFC detector. The positive pulse signals from tube 113 will serve to gate on the AFC tube 28*t* only when a code mark signal passes through the follower tube 113. In the absence of such gating signals, the AFC tube 28*t* will be biased off by the combination of D.C. voltages which is applied to its grids 163, 164 and to its cathodes 165**.

The cathodes 165 are connected through coupling resistor 166 and capacitor 167 to the cathode 168 of a triode cathode follower tube 169. The cathode follower grid 170 is connected to receiver signals through a coupling capacitor 171 and lead 172 from an R-C phase shifter 29 (see Figure 2) which is connected across the secondary winding 67 of the filter input transformer 64. In passing through the R-C network 29, all signals available at the secondary 67 will be shifted in phase 90°, and will reach the cathode circuit of the AFC tube **28*t* through the cathode follower 167** in the same relative phase.

The grids 163, 164 of the AFC tube are connected through coupling capacitors 173, 174 to the leads **70*a*, 70*b* coming from the center filter phase inverter 70. Accordingly, the AFC tube grids will receive signals which have passed through the center band filter 17, while the cathodes 165 will receive signals corresponding to the filter input but shifted 90° in phase with respect thereto. It can also be seen that signals coming to the tube grid 164 on the lead 70*b* will be in phase with signals leaving the filter 17, while those on the other lead 70*a* will be 180° out of phase therewith. Also, if these signals on the leads 70*a*, 70*b* are at a frequency above or below the center frequency of the filter 17, they will have been advanced or retarded in phase in passing through the filter 17. The phase advance or retardation which has taken place will be proportional to the frequency deviation. On the other hand, all signals coming to the cathode circuit of the tube 28*t* will be exactly 90° out of phase with the input to the filter 17** regardless of frequency.

Using the signal at its cathodes 165 from the phase shifter 29 as a fixed phase reference, the tube **28*t* will detect any phase shift in the signals arriving at its grids 163, 164. A signal exactly at the center frequency of the filter 17 will arrive at one grid advanced in phase 90° with respect to the cathode signal, and at the other grid it will be retarded in phase 90° with respect to the same reference signal. Such a signal will cause equal current flow through both sections of the tube 28*t*. However, any change in frequency of the signal will cause a corresponding phase shift which will be reflected by an unbalance in the currents through the two sections of the tube 28*t*. These unbalanced currents will result in a corresponding unbalance in the D.C. voltages which are applied as control signals directly from the AFC tube anodes 175, 176 to the grids 177, 178 of a dual triode current amplifier tube 179**.

The anode circuits of the current amplifier 179 each include one of the primary windings 181, 182 of a magnetic amplifier 30. The amplifier secondaries 185, 186 are center tapped, and the center taps 187 are connected in common to one side of a 6.3 volt A.C. source, comprising the secondary 188 of a transformer 189. The end terminals of each of the amplifier secondaries 185, 186 are connected through oppositely polarized rectifiers 191, 192 and through a reversing switch assembly 193 to a pair of shading pole windings 194, 195 of a shaded pole motor 31 which is mechanically linked to the receiver tuning shaft 12 as previously mentioned. The motor windings 194, 195 have a common return 196 to the other side of the A.C. source 188. Thus, the shading pole currents will flow through the amplifier secondaries 185, 186, flowing unidirectionally on alternate half cycles through the individual sections of the secondaries because of the rectifiers 191, 192.

The relative amount of current flow through each shading pole winding circuit will depend on the relative impedances of the amplifier secondaries 185, 186, as determined by the current flow through the associated primaries 181, 182, respectively. When the shading pole winding currents become unbalanced, the effect is the same as though one or the other shading pole had been shorted or partially shorted out, which will cause the motor 31 to turn in the direction associated with shorting out the shaded pole thus affected. Since it cannot be determined in advance which direction the motor 31 should turn to correct for a given tuning error, the connection between the magnetic amplifier secondaries and the shading pole windings is made through the reversing switch assembly 193 to allow the operator to set up the correct relationship between frequency error and corrective adjustment, once such relationship has been determined by trial. Upon making the correct connection for any given signal, the relationship thereafter will not change and the system will automatically maintain the receiver in correct tuning for that signal in spite of any drift either in the received signal frequency or in the tuning of the receiver circuits. The reversing switch 193 also has an open position, cutting off the shading pole currents. This permits the operator to disable the motor 31 temporarily for initial manual tuning.

The exciting winding 197 of the motor 31 is energized from an A.C. source, designated by arrows 198, which also supplies the primary 199 of the shading winding transformer 189. One connection to the motor winding 197 is made through a parallel-connected resistor 200 and rectifier 201. The rectifier-resistor combination 200, 201 is placed in the circuit to provide a D.C. current component which gives eddy current braking of the motor 31, making the system more stable.

The portion of the system which provides a cathode ray tube display of receiver tuning (see Figure 2) includes horizontal and vertical deflection amplifiers embodied in a dual triode tube 203. The grid 204 in the vertical amplifier section of the tube 203 receives a combination of signals from the two side band filters 16, 18, via the side band phase splitters 68, 69 while the grid 205 of the horizontal amplifier section of the tube 203 receives its signal from the center band filter 17 via the center band phase splitter 70. For an A.-F. signal at the midfrequency (2500 c.p.s.) of the center band filter 17, the phase relationship between the side band filter outputs will be 180°, and both will be 90° displaced from the center band filter output. In order to provide in-phase signals from the side band filters, the vertical amplifier grid 204 is connected through summing resistors 206 to the plate circuit of the lower side band phase splitter 68 and to the cathode circuit of the upper side band phase splitter 69. Accordingly, at the midfrequency of the center band filter, the horizontal and vertical amplifier outputs, as supplied to the deflection plates 207, 208 of the cathode ray tube 32, will be 90 degrees out of phase; a relationship which will produce a perfectly horizontal flattened ellipse on the cathode ray tube screen. However, if the signal frequency varies above or below the center frequency, the phase relationship will change from 90° and one or the other of the side band outputs will increase in amplitude. The combination of these effects will be to tilt the ellipse on the cathode ray tube screen in one direction or the other, depending on whether the frequency deviation is above or below center frequency. By watching the cathode ray tube screen while manipulating the tuning motor reversing switch 193 (Figure 3), the operator can determine the correct switch position to give automatic tracking of the receiver on the incoming signal.

The various circuits referred to in the foregoing receive suitable operating voltages from a power supply 209 (Figure 3). The power supply includes a transformer 210 which is energized from the usual 110 volt A.C. source (not shown) through an on-off switch 211. The circuit of a full wave rectifier dual diode tube 212 includes a series choke 213 and regulating dual triode tube 214, the latter being controlled by a pentode control amplifier tube 216 which has a reference voltage gas tube 217 in its cathode circuit. The control grid 218 of the amplifier pentode 216 is connected to a potentiometer 219 which is adjustable to provide 250 volts regulated D.C. at the cathodes 220 of the regulating triode 214. Two resistors 221, 222 are connected in series across the 250 volt source to form a filament voltage bias divider coupled to the separate transformer secondary winding 224 which supplies heating current to the filaments of the power supply tubes 214, 216.

All of these tubes in the system receive the 250 volt regulated D.C. voltage as anode voltage, as indicated by the ⊕ symbol shown throughout the drawings, except the cathode ray tube 32 and the magnetic amplifier control tube 179. The cathode ray tube 32 receives operating voltages from suitable tap points on a voltage divider network 226—230, which is connected through rectifiers 232, 233 and lead 234 to the high voltage side of the choke coil 213. The control tube 179 receives its anode voltage (350 volts D.C.) from the low voltage side of the choke coil 213, as indicated by the arrows 350.

As an example of one complete system embodying the invention which has been operated with excellent results, the following table of component values is given for the circuits shown in Figures 2–4, it being understood that various features of the invention are not limited to the use of such component values:

| Resistors: | Resistance (ohms) |
|---|---|
| 36, 41 | 6,800 |
| 38, 73, 99, 103, 106, 109, 146, 245, 259 | 220,000 |
| 39, 88, 90, 94, 133, 144, 145, 149, 155, 162, 228, 240, 242, 244 ----megohm | 1 |
| 45, 46, 123, 221 | 150,000 |
| 48 | 82,000 |
| 57, 121, 154, 180, 215 | 120,000 |
| 58, 131 ----megohm | 2.2 |
| 59 ----do | 1.5 |
| 66, 247 | 33,000 |
| 71, 138, 219 | 25,000 |
| 74, 104, 148, 264, 267, 269 | 47,000 |
| 78, 79 | 51,000 |
| 87, 98, 120, 222, 257, 266, 271, 273, 274 | 100,000 |
| 93 | 500,000 |
| 107, 108 | 510,000 |
| 111,139 | 27,000 |
| 114 | 50,000 |
| 119 | 7,500 |
| 122 | 56,000 |
| 140, 236 | 68,000 |
| 157, 183 ----megohm | 5 |
| 166, 184 | 22,000 |
| 190, 241 | 12,000 |
| 196 | 500 |
| 200 | 100 |
| 202 | 22 |
| 206, 225, 249, 250, 256 | 470,000 |
| 223 | 1,000 |
| 226 ----megohm | 1.2 |
| 227 ----do | 2 |
| 229 | 390,000 |
| 230 | 300,000 |
| 231 | 330,000 |
| 234 | 20,000 |
| 237 | 160,000 |
| 239 ----megohm | 5.6 |
| 243 | 180,000 |
| 246 | 18,000 |
| 261 ----megohm | 3 |
| 262 | 2,200 |
| 270 | 10,000 |

| Capacitors: | Capacity in microfarads |
|---|---|
| 32, 42, 171, 238, 263 | 0.01 |
| 44, 125, 129, 167, 265, 275 | 0.1 |
| 47, 173, 174 | $680\times10^{-6}$ |
| 50, 82, 268 | 0.001 |
| 60, 158 | $220\times10^{-6}$ |
| 65, 254 | 0.02 |
| 72, 248 | 10.0 |
| 76, 272 | 0.0022 |

| Capacitors: | Capacity in microfarads |
|---|---|
| 117 | 2.0 |
| 124 | 0.03 |
| 126 | 0.015 |
| 127, 251 | 0.05 |
| 128 | 0.5 |
| 147, 258 | 0.0047 |
| 235, 276 | 20.0 |
| 252, 253, 255 | 0.002 |
| 260 | $100\times10^{-6}$ |

| Tubes: | Tube type |
|---|---|
| 14a, 14b, 19t, 205, 21t, 22t, 28t | 12AX7 |
| 24t, 68, 69, 70, 203 | 12AT7 |
| 26a, 151 | 1/2–12AT7 |
| 32 | 3KP1 |
| 62, 113, 160, 169 | 1/2–12AU7 |
| 100, 101, 142, 143, 159 | NE–2 |
| 179 | 12BH7 |
| 212 | 5Y3GT |
| 214 | 5687 |
| 216 | 6AU6 |
| 217 | 5651 |

| Coils: | Inductance in henries |
|---|---|
| 130 | 250 |
| 213 | 15 |

What is claimed is:

1. In a system for eliminating undesired static signals from a mixture of such signals and desired signals of predetermined audio frequency obtained from a tunable radio receiver, in combination, a band pass filter having its input connected to said receiver and having a narrow frequency range pass band centering at said predetermined frequency, a full wave detector connected to said filter to demodulate signals passing through said filter, a phase comparison circuit connected to receive both the signals supplied to said filter and the signals that have passed through said filter to compare the phase relation therebetween, said phase comparison circuit also being connected to receive signals from said detector and being operable only upon receipt of signals from the detector to provide a control signal representative of changes in the phase of desired signals passing through said filter, thereby being substantially unresponsive to static signals, and control means connected to said phase comparison circuit and operable in response to control signals received therefrom to adjust the tuning of said receiver so as to maintain the desired audio frequency signal therefrom at said predetermined frequency, regardless of the presence of static signals.

2. In a system for eliminating undesired static signals from a mixture of such signals and of desired signals of predetermined audio frequency obtainable from a tunable radio receiver, in combination, a band-pass filter connectable to said receiver for filtering from said mixture all signals of frequency outside the pass band of said filter, said filter having a narrow frequency pass band centering at said predetermined frequency, a signal level detector circuit connected to said filter to pass only signals of greater than predetermined amplitude received from said filter, frequency-sensitive control means having an input circuit connected to the input to said filter, first circuit means connecting said frequency-sensitive control means to the output of said filter, second circuit means connecting said frequency-sensitive control means to the output from said detector circuit, said frequency-sensitive control being inoperative in the absence of any signal output from said detector and being responsive to the difference in phase between the signal input to and output from said filter to control the receiver tuning to maintain said desired signals at said predetermined frequency, and an output circuit connected to the output of said filter.

3. In a system for eliminating undesired static signals from a mixture of such signals and of desired signals of predetermined audio frequency obtainable from a tunable radio receiver, in combination, a band-pass filter connectable to said receiver for filtering from said mixture all signals of frequency outside the pass band of said filter, said filter having a narrow frequency pass band centering at said predetermined frequency, a detector circuit connected to said filter for demodulating signals passing through said filter, level detector circuit means connected to said detector circuit and adapted to pass only individual signal impulses of greater than predetermined level, an output circuit connected to the output of said level detector circuit means, frequency-sensitive control means having an input connected to the input to said filter to receive said signal mixture, said frequency-sensitive control being connected to the output of said filter and also being connected to the output of said level detector circuit means, said frequency-sensitive control comparing said signal mixture with the signal from the output of said filter, for controlling the receiver tuning to maintain said desired signals at said predetermined frequency, the operation of said frequency-sensitive control being regulated by said level detector circuit means and operating in response to the appearance of the desired signals at the output of said level detector circuit means, thereby producing the desired tuning action regardless of the presence of static signals in said mixture.

4. In a system for eliminating undesired static signals from a mixture of such signals and desired signals of predetermined frequency obtainable from a tunable radio receiver, in combination, a first band-pass filter having a narrow frequency range pass band centering at said predetermined frequency, second and third band-pass filters having pass bands including at least some frequencies extending upwardly and downwardly, respectively, from the upper and lower limits of said first filter pass band, said filters having input circuit means connectable in common to said receiver to receive said signal mixture therefrom, a comparison circuit connected to said filters to compare signals from said first filter with combined signals from said second and third filters to provide a resultant signal corresponding to the differences between said compared signals, and normally inoperative frequency-sensitive control means connectable to said receiver, for tuning the receiver, said frequency sensitive control means being connected to receive both the signals supplied to said first filter and the signals passing through said first filter and being connected to receive said resultant signal, being rendered operative by said resultant signal for adjusting the tuning of said receiver to correct for deviations of said desired signals from said predetermined frequency.

5. The invention defined in claim 4 including a low pass filter, and a signal level detector circuit connected to said comparison circuit through said low pass filter and cooperable with said low pass filter to pass only individual signal impulses of greater than predetermined time duration.

6. A system for eliminating undesired static signals from a mixture of such signals and desired signals of predetermined audio frequency obtainable from a tunable radio receiver, and for automatically tuning the receiver, said system including a limiter circuit having an input terminal adapted to be connected to an output of said receiver for equalizing the amplitudes of signals obtained from said receiver, a band pass filter having a narrow frequency range pass band centering at said predetermined frequency, said filter being connected to said limiter circuit to receive signals therefrom, a full wave detector circuit connected to said filter to demodulate signals passing through said filter, a first level detector circuit connected to said full wave detector circuit and adapted to pass only individual signal impulses of greater than predetermined amplitude received from said full wave detector circuit, a low pass filter circuit, a second level detector circuit connected through said low pass filter to said first level detector and cooperable with said low pass filter to pass only individual signal impulses of greater than predetermined time duration received from said first level detector, a phase comparison circuit connected to said limiter circuit and also connected to said band pass filter to compare the phase of signals supplied to said band pass filter with the phase of signals passing through said band pass filter to provide a control signal representative of phase changes in signals passing through said band pass filter, said phase comparison circuit also being connected to said first level detector circuit to operate only during the passage of a signal impulse through said first level detector circuit, and tuning means adapted to be connected to the receiver for tuning it, said tuning means including a magnetic amplifier responsive to control signals from said phase comparison circuit to maintain the desired signal output from said receiver at said predetermined frequency.

7. In a system for eliminating undesired static signals from a mixture of such signals and desired signals of predetermined audio frequency obtained from a tunable radio receiver, in combination, a limiter circuit connectable to said receiver for equalizing the amplitudes of signals obtained from said receiver, a first band pass filter having a narrow frequency range pass band centering at said predetermined frequency, second and third band pass filters having pass bands of frequency range equal to said narrow frequency range and extending upwardly and downwardly, respectively, from the upper and lower limits of said first filter pass band, said filters being connected in common to said limiter circuit, first, second and third full wave detector circuits connected one to each of said first, second and third filters, respectively, to demodulate signals passing through said filters, a comparison circuit connected to said detector circuits to compare signals from said first detector with combined signals from second and third detectors to provide a resultant signal corresponding to the difference between said compared signals, a signal level detector circuit connected to said comparison circuit and adapted to pass only individual signal impulses of greater than predetermined amplitude received from said comparison circuit, a phase comparison circuit connected to said limiter circuit and also connected to said first filter to compare the phase of signals supplied to said first filter with the phase of signals passing through said first filter to provide a control signal representative of phase changes in signals passing through said first filter, said phase comparison circuit also being connected to said signal level detector circuit to operate only during the passage of a signal impulse through said level detector circuit, a motor adapted to be connected to the receiver for adjusting the tuning of said receiver, and means including a magnetic amplifier connecting said motor to said phase comparison circuit for operating said motor in response to control signals from said phase comparison circuit to maintain the desired signal output from said receiver at said predetermined frequency.

8. In a system for eliminating undesired static signals from a mixture of such signals and desired signals of predetermined audio frequency obtained from a tunable radio receiver, in combination, a limiter circuit connectable to said receiver for equalizing the amplitudes of signals obtained from said receiver, a band pass filter having a narrow frequency range pass band centering at said predetermined frequency, said filter being connected to said limiter circuit to receive signals therefrom, a full wave detector circuit connected to said filter to demodulate signals passing through said filter, a first level detector circuit connected to said full wave detector circuit and adapted to pass only individual signal impulses of greater than predetermined amplitude received from said full wave detector, a low pass filter circuit, a second level detector circuit connected through said low pass filter to said first level detector and cooperable with said low pass filter to pass only individual signal impulses of greater than predetermined time duration received from said first level detector, an audio frequency oscillator connected to said second level detector and responsive to signal impulses received therefrom to provide an audio frequency signal representing each received signal impulse, a phase shifting circuit of fixed, frequency-insensitive phase shifting characteristics, a phase comparison circuit connected through said phase shifting circuit to said limiter circuit and also connected to said band pass filter to compare the phase signals supplied to said band pass filter with the phase of signals passing through said band pass filter to provide a control signal representative of phase changes in signals passing through said band pass filter, said phase comparison circuit also being connected to said first level detector circuit to operate only during the passage of a signal impulse through said first level detector circuit, a motor connectable to the receiver for adjusting the tuning of said receiver, means including a magnetic amplifier connecting said motor to said phase comparison circuit for operating said motor in response to control signals from said phase comparison circuit to maintain the desired signal output from said receiver at said predetermined frequency.

9. In a system for eliminating undesired static signals from a mixture of such signals and desired signals of predetermined audio frequency obtainable from a tunable radio receiver, in combination, a limiter circuit connectable to said receiver for equalizing the amplitudes of signals obtained from said receiver, a first band pass filter having a narrow frequency range pass band centering at said predetermined frequency, second and third band pass filters having pass bands of frequency range equal to said narrow frequency range and extending upwardly and downwardly, respectively, from the upper and lower limits of said first filter pass band, said filters being connected in common to said limiter circuit, first, second and third full wave detector circuits connected to said first, second and third filters, respectively, to demodulate signals passing through said filters, a comparison circuit connected to said detector circuits to compare signals from said first detector with combined signals from said second and third detectors to provide a resultant signal corresponding to the differences between said compared signals, a first level detector circuit connected to said comparison circuit and adapted to pass only individual signal impulses of greater than predetermined amplitude received from said comparison circuit, a low pass filter circuit, a second level detector circuit connected through said low pass filter to said first level detector and cooperable with said low pass filter to pass only individual signal impulses of greater than predetermined time duration received from said first level detector, an audio frequency oscillator connected to said second level detector and responsive to signal impulses received therefrom to provide an audio frequency signal representing each received signal impulse, a phase shifting circuit of fixed, frequency-insensitive phase shifting characteristics, a phase comparison circuit connected through said phase shifting circuit to said limiter circuit and also connected to said first filter to compare the phase of signals supplied to said first filter with the phase signals passing through said first filter to provide a control signal representative of phase changes in signals passing through said first filter, said phase comparison circuit also being connected to said first level detector circuit to operate only during the passage of a signal impulse through said first level detector circuit, a motor for connection to the receiver for adjusting the tuning of said receiver, means including a magnetic amplifier connecting said motor to said phase comparison circuit for operating said motor in response to control signals from said phase comparison circuit to maintain the desired signal output from said receiver at said predetermined frequency, a cathode ray tube including horizontal and vertical beam deflection electrodes, and means connecting said cathode ray tube electrodes to said first, second and third filters to supply to said deflection electrodes voltage representative of the phase relation between signals passing through said first filter and signals passing through said second and third filters.

10. A system for eliminating undesired signals from a mixture of such signals and desired signals of predetermined frequency obtainable from a tunable radio receiver and for automatically tuning the radio receiver in accordance with the desired signals while minimizing the effect of undesired signals on said automatic tuning comprising a first band pass filter having a narrow frequency range pass band centering at said predetermined frequency, second and third band pass filters having second and third pass bands, respectively, each of said second and third pass bands including at least some frequencies outside of the other pass band, said latter frequencies lying on opposite sides, respectively, of the center frequency of said first filter pass band, said filters being connected in parallel to receive said signal mixture, circuit means connected to all of said filters and operable to reject all signals which have frequency components within the pass band of all of said filters, said circuit means passing signals which have frequency components only in the pass band of the first filter, whereby the desired signals of said predetermined frequency are passed and undesired static signals are rejected and normally passive frequency sensitive control means connected to the output of said circuit means and adapted to be connected to said receiver and responsive to signals received therefrom and being placed in active condition by signals passing said circuit means for automatically maintaining the desired signal output of said receiver centered at said predetermined frequency in accordance with the desired signals while minimizing the effect of undesired signals on the automatic tuning.

11. A system for eliminating undesired static signals from a mixture of such signals and desired signals of predetermined frequency obtainable from a tunable radio receiver and for automatically controlling the tuning of the receiver comprising a first band pass filter having a narrow frequency range pass band centering at said predetermined frequency, a second band pass filter having a pass band of frequency range equal to said narrow frequency range and lying immediately adjacent to said first filter pass band, said filters being connectable in common to said receiver to receive said signal mixture therefrom, a comparison circuit including first and second control electrodes connected to said first and second filters, respectively, to compare signals from said first filter with signals from said second filter, said comparison circuit having an output circuit controlled simultaneously by said first and second electrodes and providing a resultant signal corresponding to the difference between said compared signals, and frequency-sensitive control means connected to the output circuit of said comparison circuit and being responsive to signals from said receiver and responsive to said resultant signal for maintaining the desired signal output of said receiver centered at said predetermined frequency.

12. In a system for eliminating undesired static signals from a mixture of such signals and desired signals of predetermined frequency obtaintable from a tunable radio receiver, a first band-pass filter having a first narrow frequency-range pass band centering at substantially said predetermined frequency, a second band-pass filter having a pass band of frequency range approximately equal to said narrow frequency-range of the first filter, said second filter centering at a second center frequency different from the center frequency of said first filter, the difference between said center frequencies being at least equal to one-half of the effective width of said first pass band, said filters being connectible in common to said receiver to receive said mixture of signals therefrom, a comparison circuit coupled to the outputs of both of said filters and providing a resultant signal corresponding to the difference between the outputs of said filters, said comparison circuit producing no resultant signal when the outputs of the filters are substantially the same, and normally inactive frequency-sensitive control means connected to be rendered active by said resultant signal and connected to receive both the signals supplied to said first filter and the signals passing through said first filter for adjusting the tuning of said receiver to correct for deviations of said desired signals from said predetermined frequency.

13. In a system as claimed in claim 12, a third band-pass filter having a pass band of frequency range approximately equal to said narrow frequency-range of the first filter, said third filter centering at a third center frequency different from the center frequency of said first filter and on the opposite side of the center frequency thereof from said second center frequency, the difference between said third and first center frequencies being at least equal to one-half of the effective width of said first pass band, said comparison circuit comparing the output of said first filter with the combined outputs from said second and third filters and providing a resultant signal corresponding to the difference between the output of the first filter and said combined outputs, said comparison circuit producing no resultant signal when the output of the first filter is substantially the same as said combined outputs, and an output circuit connected to said comparison circuit and responsive to said resultant signal.

14. A system for eliminating undesired static signals from a mixture of such signals and desired signals of predetermined frequency obtainable from a tunable radio receiver, said system including a first band-pass filter having a first narrow frequency-range pass band centering at substantially said predetermined frequency, second and third band-pass filters each having a pass band of frequency characteristics similar to those of the first filter, said second and third filters passing some frequencies on either side of those within the pass band of the first filter, said filters having an input circuit in common adapted to be connected to a receiver so as to receive said mixture of signals therefrom, first, second and third detector circuits connected respectively to the output of each of said filter circuits, a comparison circuit connected to the output of said first detector, a summing network connected to the output of said second and third detectors and having its output connected to said comparison circuit, said comparison circuit providing a resultant signal corresponding to the difference between the outputs of said first detector and said summing network, and bi-stable level detector means connected to said comparison circuit and having first and second conditions of operation and normally being in said first condition of operation and being placed in said second condition of operation when said resultant signal reaches a predetermined level.

15. A system for eliminating undesired static signals from a mixture of such signals and desired signals of predetermined frequency obtained from a tunable radio receiver and for automatically tuning the receiver in accordance with the actual frequency of the desired signals so as to maintain their actual frequency substantially at said predetermined frequency while avoiding any significant effect on the automatic tuning due to the presence of static signals, said system including a band-pass filter having an input adapted to be connected to an output of the receiver, said band-pass filter having a narrow frequency range pass band centering at said predetermined frequency, a full-wave detector connected to said filter to demodulate signals passing through said filter, a phase comparison circuit connected to receive both the signals supplied to said filter and the signals that have passed through said filter to compare the phase relation therebetween, said phase comparison circuit also being connected to receive signals from said detector and being under the control of said detector and operable only upon receipt of signals from the detector showing that desired signals are being received, thereby to provide a control signal representative of changes in the phase of desired signals passing through said filter while being substantially non-responsive to the presence of static signals, and control means connected to said phase comparison circuit and operable in response to control signals received therefrom and adapted to be connected to the radio receiver to adjust the tuning of said receiver so as to maintain the actual frequency of the desired signals therefrom substantially at said predetermined frequency, regardless of the presence of static signals.

References Cited in the file of this patent

UNITED STATES PATENTS

| | | |
|---|---|---|
| 2,174,566 | Case | Oct. 3, 1939 |
| 2,232,390 | Katzin | Feb. 18, 1941 |
| 2,434,937 | Labin et al. | Jan. 27, 1948 |
| 2,586,190 | Wasmansdorff | Feb. 19, 1952 |
| 2,677,049 | Rogers | Apr. 27, 1954 |
| 2,692,330 | Kahn | Oct. 19, 1954 |